(12) United States Patent
Gardenfors et al.

(10) Patent No.: US 8,626,086 B2
(45) Date of Patent: *Jan. 7, 2014

(54) RADIO TRANSCEIVER ON A CHIP

(75) Inventors: Karl Hakan Torbjorn Gardenfors, Malmo (SE); Sven Mattisson, Bjarred (SE); Jacobus Cornelis Haartsen, Staffanstorp (SE)

(73) Assignee: Telefonaktiebolaget L M Ericssson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/205,984

(22) Filed: Aug. 9, 2011

(65) Prior Publication Data

US 2012/0028595 A1 Feb. 2, 2012

Related U.S. Application Data (63) Continuation of application No. 12/501,616, filed on Jul. 13, 2009, now Pat. No. 8,005,439, which is a continuation of application No. 11/044,287, filed on Jan. 27, 2005, now Pat. No. 7,580,683, which is a continuation of application No. 10/822,594, filed on Apr. 12, 2004, now Pat. No. 7,068,171, which is a continuation of application No. 10/626,025, filed on Jul. 24, 2003, now Pat. No. 7,149,191, which is a continuation of application No. 08/803,392, filed on Feb. 20, 1997, now Pat. No. 6,633,550.

(51) Int. Cl.
*H04B 1/40* (2006.01)

(52) U.S. Cl.
USPC .......................................................... 455/86

(58) Field of Classification Search
USPC ........... 455/73, 75, 76, 78, 80, 82, 83, 86, 87, 455/307, 313, 314, 315, 324, 302
See application file for complete search history.

(56) References Cited

U.S. PATENT DOCUMENTS

| | | | |
|---|---|---|---|
| 3,324,396 A | 6/1967 | Schneider | |
| 4,426,735 A | 1/1984 | Kasperkovitz | |
| 4,464,770 A | 8/1984 | Maurer et al. | |

(Continued)

FOREIGN PATENT DOCUMENTS

| | | |
|---|---|---|
| CA | 1304786 | 7/1992 |
| CA | 1318358 | 5/1993 |

(Continued)

OTHER PUBLICATIONS

Ericsson, Ericsson Technology Licensing—Bluetooth, pp. 1-5; www.ericsson.com/biuetooth <htt•://www.ericsson.com/bluetooth>; Jul. 23, 2004.

(Continued)

*Primary Examiner* — Thanh Le
(74) *Attorney, Agent, or Firm* — Potomac Patent Group PLLC (57) ABSTRACT

An entire radio transceiver can be completely integrated into one IC chip. In order to integrate the IF filters on the chip, a heterodyne architecture with a low IF is used. A single, directly modulated VCO is used for both up-conversion during transmission, and down-conversion during reception. Bond-wires are used as resonators in the oscillator tank for the VCO. A TDD scheme is used in the air interface to eliminate cross-talk or leakage. A Gaussian-shaped binary FSK modulation scheme is used to provide a number of other implementation advantages.

18 Claims, 5 Drawing Sheets

(56) References Cited

U.S. PATENT DOCUMENTS

| | | | |
|---|---|---|---|
| 4,470,071 A | 9/1984 | Rindal | |
| 4,476,585 A | 10/1984 | Reed | |
| 4,523,324 A | 6/1985 | Marshall | |
| 4,523,328 A | 6/1985 | Kasperkovitz | |
| 4,551,688 A | 11/1985 | Craiglow | |
| 4,569,085 A | 2/1986 | Nolde et al. | |
| 4,584,715 A | 4/1986 | Baars et al. | |
| 4,633,315 A | 12/1986 | Kasperkovitz | |
| 4,653,117 A | 3/1987 | Heck | |
| 4,656,463 A | 4/1987 | Anders et al. | |
| 4,718,113 A | 1/1988 | Rother | |
| 4,776,039 A | 10/1988 | Akaiwa | |
| 4,817,198 A | 3/1989 | Rinderle | |
| 4,837,853 A | 6/1989 | Heck | |
| 4,852,123 A | 7/1989 | Bickley et al. | |
| 4,888,557 A | 12/1989 | Puckette, IV et al. | |
| 4,893,316 A | 1/1990 | Janc et al. | |
| 4,896,374 A | 1/1990 | Waugh et al. | |
| 4,926,443 A | 5/1990 | Reich | |
| 4,944,025 A | 7/1990 | Gehring et al. | |
| 4,972,455 A | 11/1990 | Phillips et al. | |
| 5,003,621 A | 3/1991 | Gailus | |
| 5,020,092 A | 5/1991 | Phillips et al. | |
| 5,020,147 A * | 5/1991 | Okanobu | 455/302 |
| 5,033,110 A | 7/1991 | Harman | |
| 5,052,027 A | 9/1991 | Poklemba et al. | |
| 5,079,526 A | 1/1992 | Heck | |
| 5,126,682 A | 6/1992 | Weinberg | |
| 5,134,404 A | 7/1992 | Peterson | |
| 5,140,286 A | 8/1992 | Black et al. | |
| 5,155,862 A | 10/1992 | Hansen | |
| 5,162,723 A | 11/1992 | Marzalek et al. | |
| 5,194,829 A | 3/1993 | Schoffel | |
| 5,212,825 A | 5/1993 | Layton | |
| 5,222,144 A | 6/1993 | Whikehart | |
| 5,241,561 A | 8/1993 | Bernard | |
| 5,241,702 A | 8/1993 | Dent | |
| 5,251,218 A | 10/1993 | Stone et al. | |
| 5,263,194 A | 11/1993 | Ragan | |
| 5,265,267 A | 11/1993 | Martin et al. | |
| 5,272,534 A | 12/1993 | Vromans et al. | |
| 5,282,228 A | 1/1994 | Scott | |
| 5,307,517 A | 4/1994 | Rich | |
| 5,313,173 A | 5/1994 | Lample | |
| 5,323,332 A | 6/1994 | Smith et al. | |
| 5,324,396 A | 6/1994 | Ferron et al. | |
| 5,335,361 A | 8/1994 | Ghaem | |
| 5,339,463 A | 8/1994 | Hansen | |
| 5,367,539 A | 11/1994 | Copley | |
| 5,369,470 A | 11/1994 | Hansen | |
| 5,390,363 A | 2/1995 | Mirtich et al. | |
| 5,396,520 A | 3/1995 | Degges | |
| 5,402,087 A | 3/1995 | Gorczak | |
| 5,404,589 A | 4/1995 | Bijker et al. | |
| 5,410,733 A | 4/1995 | Niva et al. | |
| 5,410,745 A | 4/1995 | Friesen et al. | |
| 5,428,835 A | 6/1995 | Okanobu | |
| 5,428,837 A | 6/1995 | Bayruns et al. | |
| 5,430,770 A | 7/1995 | Abbey | |
| 5,438,692 A | 8/1995 | Mohindra | |
| 5,440,587 A | 8/1995 | Ishikawa et al. | |
| 5,471,665 A | 11/1995 | Pace et al. | |
| 5,481,224 A | 1/1996 | Kimura | |
| 5,491,457 A | 2/1996 | Feher | |
| 5,517,530 A | 5/1996 | Gardner | |
| 5,521,548 A | 5/1996 | Sugawara | |
| 5,528,769 A | 6/1996 | Berenz et al. | |
| 5,537,435 A | 7/1996 | Carney et al. | |
| 5,548,582 A | 8/1996 | Brajal et al. | |
| 5,548,831 A | 8/1996 | Bijker et al. | |
| 5,550,596 A | 8/1996 | Strolle | |
| 5,550,865 A | 8/1996 | Cripps | |
| 5,561,689 A | 10/1996 | Fleek et al. | |
| 5,584,068 A | 12/1996 | Mohindra | |
| 5,598,405 A | 1/1997 | Hirose | |
| 5,604,927 A | 2/1997 | Moore | |
| 5,619,491 A | 4/1997 | Panzer | |
| 5,619,536 A | 4/1997 | Gourgue | |
| 5,640,416 A | 6/1997 | Chalmers | |
| 5,640,698 A | 6/1997 | Shen et al. | |
| 5,649,288 A | 7/1997 | De Loe, Jr. et al. | |
| 5,661,487 A | 8/1997 | Targoff | |
| 5,673,323 A | 9/1997 | Schotz et al. | |
| 5,694,417 A | 12/1997 | Andren et al. | |
| 5,710,993 A | 1/1998 | Brekelmans | |
| 5,710,998 A | 1/1998 | Opas | |
| 5,715,281 A | 2/1998 | Bly et al. | |
| 5,715,529 A | 2/1998 | Kianush et al. | |
| 5,724,653 A | 3/1998 | Baker et al. | |
| 5,734,970 A | 3/1998 | Saito | |
| 5,734,976 A | 3/1998 | Bartschi et al. | |
| 5,740,522 A | 4/1998 | Dolman et al. | |
| 5,745,843 A | 4/1998 | Wetters et al. | |
| 5,751,188 A | 5/1998 | Guegnaud et al. | |
| 5,751,249 A | 5/1998 | Baltus et al. | |
| 5,757,531 A | 5/1998 | Tomesen et al. | |
| 5,758,265 A | 5/1998 | Okanobu | |
| 5,761,613 A | 6/1998 | Saunders et al. | |
| 5,781,847 A | 7/1998 | Clarke et al. | |
| 5,784,414 A | 7/1998 | Bruekers et al. | |
| 5,796,730 A | 8/1998 | Bellec | |
| 5,799,042 A | 8/1998 | Xiao | |
| 5,802,117 A | 9/1998 | Chosh | |
| 5,802,463 A | 9/1998 | Zuckerman | |
| 5,808,569 A | 9/1998 | Wuppermann et al. | |
| 5,809,015 A | 9/1998 | Elliott et al. | |
| 5,809,096 A | 9/1998 | Martinez et al. | |
| 5,822,378 A | 10/1998 | Van Veldhuizen | |
| 5,828,705 A | 10/1998 | Kroeger et al. | |
| 5,828,955 A | 10/1998 | Lipowski et al. | |
| 5,832,043 A | 11/1998 | Eory | |
| 5,838,730 A | 11/1998 | Cripps | |
| 5,848,107 A | 12/1998 | Philips | |
| 5,850,598 A | 12/1998 | Behrent | |
| 5,854,973 A | 12/1998 | Holtvoeth | |
| 5,867,535 A | 2/1999 | Phillips et al. | |
| 5,875,212 A | 2/1999 | Fleek et al. | |
| 5,890,055 A | 3/1999 | Chu et al. | |
| 5,896,375 A | 4/1999 | Dent et al. | |
| 5,901,349 A | 5/1999 | Guegnaud et al. | |
| 5,926,513 A | 7/1999 | Suominen | |
| 5,937,341 A | 8/1999 | Suominen | |
| 5,963,273 A | 10/1999 | Boie | |
| 5,999,802 A | 12/1999 | Aschwanden | |
| 6,006,081 A | 12/1999 | Moore | |
| 6,028,885 A | 2/2000 | Minarik et al. | |
| 6,035,186 A | 3/2000 | Moore | |
| 6,226,509 B1 | 5/2001 | Mole et al. | |
| 6,374,093 B1 | 4/2002 | Pesola | |
| 6,374,094 B1 | 4/2002 | Zappala | |
| 6,427,068 B1 | 7/2002 | Suominen | |
| 6,477,148 B1 | 11/2002 | Gardenfors et al. | |
| 6,560,447 B2 | 5/2003 | Rahman et al. | |
| 6,597,748 B1 | 7/2003 | Hietala et al. | |
| 6,631,256 B2 | 10/2003 | Suominen | |
| 6,633,550 B1 | 10/2003 | Mattisson et al. | |
| 6,633,979 B1 | 10/2003 | Smeets | |
| 2002/0090924 A1 | 7/2002 | Suominen | |
| 2002/0094037 A1 | 7/2002 | Darabi et al. | |
| 2004/0038655 A1 | 2/2004 | Suominen | |

FOREIGN PATENT DOCUMENTS

| | | |
|---|---|---|
| DE | 19502111 A1 | 1/1995 |
| EP | 0598277 | 5/1994 |
| EP | 0671818 | 9/1995 |
| EP | 0472119 B1 | 12/1995 |
| EP | 0512374 B1 | 8/1996 |
| EP | 0470484 B1 | 9/1996 |
| EP | 0470481 B1 | 10/1996 |
| EP | 0 742 647 A1 | 11/1996 |
| EP | 0 797 292 A1 | 9/1997 |
| EP | 0855804 | 7/1998 |
| EP | 1 058 396 A1 | 12/2000 |

(56) References Cited

FOREIGN PATENT DOCUMENTS

| | | |
|---|---|---|
| EP | 1058399 | 12/2000 |
| EP | 1249076 B1 | 2/2004 |
| GB | 2052196 A1 | 1/1981 |
| GB | 2295513 | 5/1996 |
| GB | 2296610 A | 7/1996 |
| JP | 03006107 A | 1/1991 |
| JP | 05268109 | 10/1993 |
| JP | 06188781 A | 7/1994 |
| JP | 06204974 A | 7/1994 |
| JP | 06334553 | 12/1994 |
| JP | 07-254865 A | 10/1995 |
| JP | 08251026 | 9/1996 |
| JP | 08298475 A | 11/1996 |
| KR | 101996700580 | 11/1994 |
| WO | 94/10757 | 5/1994 |
| WO | 95 10889 | 4/1995 |
| WO | 95/15621 | 6/1995 |
| WO | 96/17441 | 6/1996 |
| WO | 96 28946 | 9/1996 |
| WO | 97/08842 | 3/1997 |
| WO | 98/08300 | 2/1998 |
| WO | 98 11672 | 3/1998 |
| WO | 02/35718 A2 | 5/2002 |

OTHER PUBLICATIONS

Gentile, Ken, Fundamentals of Digital Quadrature Modulation, "RE Mixed Signals", pp. 1-5; www.rfdesign.com <http://www,rfdesian,com>; Feb. 2003.

Wireless, RF, and Cable; Application Note 686, pp. 1-7; www.maxim-ic.com <http://www. maxim-ic com>: Oct. 13, 2000.

Steber, J. M., "PSK Demodulation" (Part 1); WJ Tech-note; vol. 11, No. 2, pp. 1-6; WJ Communications, Inc.; San Jose, CA; Mar. 1984.

Fague, D. E. et al., "Performance Evaluation of a Low Cost, Solid State Radio Front End for DECT"; IEEE; pp. 512-515; 1994.

Min, J., "Analysis & Design of a Frequency-Hopped Spread-Spectrum Transceiver for Wireless Personal Communications"; UCLA Electrical Engineering Dept.; Los Angeles, CA; pp. 1-158; Jan. 1996.

Steyaert, M. et al., "Analog Polyphase Filters in Highly Integrated Receivers", AACD; Heverlee, Belgium; pp. 364-369; Mar. 30, 1994.

Steyaert, M. et al., "Analog Integrated Polyphase Filters"; Analog Circuit Design,; Eindhoven, Netherlands; pp. 149-166; 1995.

Defrance, J. J., Communications Electronics Circuits; Holt Rinehart & Winston, New York, NY; pp. 262-265; 1966.

Roberts, R.S., I levision Engineering; Pentech Press, London, England; pp. 45-47; 1985.

Baltus, P. et al., "DECT Zero IF Receiver Front End"; Analog Circuit Design; Kluwer Academic Publishers pp. 295-318; Netherlands; 1994.

Rabaey, D. et al., "The Challenges for Analog Circuit Design in Mobile Radio VLSI Chips"; Analog Circuit Design; Kluwer Academic Publishers, Netherlands. 225-236; 1994.

Sevenhans, J. et al., "An Integrated Si Biopolar RE Transceiver for a Zero IF 900 MHz GSM Digital Mobile Radio Frontend of a Hand Portable Phone"; 1991 IEEE Custom Integrated Cuicuits Conference; pp. 7.7.1-7.7.4; 1991.

Okanobu, T. et al., "Advanced Low Voltage Single Chip Radio IC"; IEEE Transactions on Consumer Electronics; vol. 38 No. 3; pp. 465-475; Aug. 1992.

Crols, J. et al., "A Fully Integrated 900 MHz CMOS Double Quadrature Downconverter"; 1995 IEEE International Solid-State Conference; pp. 136-137; Feb. 1995.

Min, J., Liu et al., "A Low-Power Correlation Detector for Binary FSK Direct-Conversion Receivers"; UCLA, Los Angeles, CA; Jun. 22, 1995.

Chan, P.Y. et al., A Highly Linear I-GHz CMOS Downconversion Mixer; European Solid State Circuits Conference, Seville, Spain, p. 210-213, slides p. 1-25; Sep. 22, 1993.

Abidi, A. A., "Radio-Fre•uenc Intelrated Circuits for Portable Communications"; Custom IC Conference, San Diego, CA; p. 151-158; May 1994.

Rofougaran, A. et al., "A 1 GHz CMOS RF Front-End IC with Wide Dynamic Range"; European Solid State Circuits Conference, Lille, France, p. 250-253, slides p. 1-23; Sep. 1995.

Rofougaran, A. et al., "A 900 MHz CMOS LC-Oscillator with Quadrature Outputs"; International Solid-State Circuts Conference, p. 1-10; 1996.

Burt, A., "Direct Conversion Receivers Come of Age in the Paging World"; GEC Review, vol. 7 No. 3, p. 156-160; 1992.

Abidi, A. A., "Low-Power Radio-Frequency IC's for Portable Communications"; Proceedings of IEEE, vol. 83 No. 4, p. 544-569; Apr. 1995.

Abidi, A. A., "Noise in Active Resonators and the Available Dynamic Range"; IEEE Transactions on Circuits and Systems, vol. 39 No. 4, p. 296-299; Apr. 1992.

Tucker, D. G., "The History of the Homodyne and Synchrodyne"; Journal of the British Institution of Radio Entineers, •. 143-154; Jan. 4, 1954.

Vance, Lam., Fully Integrated Radio Paging Receiver; IEE Proc. vol. 129 No. 1, p. 2-6; Feb. 1982.

Yamasaki, K. et al., "Credit Card Size Numeric Display Pager with Micro-Strip Antenna for 900 MHz Band"; NEC Res. & Develo•., vol. 34 No. 1, .. 84-95; Jan. 1993.

Tanaka, S. et al., High-Frequency, Low-Voltage Circuit Technology for VHF Paging Receiver; IEICE Trans. Fundamentals, vol. E76-A, No. 2, p. 156-163; Feb. 1993.

Yamasaki, K. et al., "Compact Size Numeric Display Pager with new Receiving System"; NEC Res. & Develop., vol. 33, No. 1; pp. 73-81; Jan. 1992.

Marshall, C. et al., "A 2.7V GSM Transceiver ICs with On-Chip Filtering"; Paper TA 8.7, IEEE ISSCC; pp. 148-149; Feb. 16, 1995.

Lin, Y.-M., Kim, B., & Gray, P. R., A 13-b 2.5-MHz Self-Calibrated Pipelined ND Converter in 3 pm CMOS; IEEE Journal of Solid-State Circuits; vol. 26,-No. 4; pp. 628-636; Apr. 1991.

Leeson, D.B., "A Simple Model of Feedback Oscillator Noise Spectrum"; IEEE Proceedings Letters; pp. 329-220; Feb. 1966.

Chang, H.Y: C., Abidi, A.A. & Gaitan,. M., Large-Suspended Inductors on Silicon and Their Use in a 2-pm CMOS RF Amplifier; IEEE Electronic Device Letters; vol. 14, No. 5; pp. 246-248; May 1993.

Enam, S. K. et al., "NMOS IC's for Clock and Data Regeneration in Gigabit-per-Second Optical-Fiber Receivers"; IEEE Journal of Solid-State Circuits; vol. 27, No. 12; pp. 1763-1774; Dec. 1992.

Buchwald, A.W. et al., "High Speed Voltage-Controlled Oscillator with Quadrature Outputs"; pp. 1-2; Dec. 19, 1990.

Thomas, V. et al. "A One-Chip 2 GHz Single Superhet Receiver for 2 Mb/s FSK Radio Communication"; Paper WP 2.7; Digest of Technical Papers; IEEE ISSCC; pp. 42-43; Feb. 16, 1994.

Veit, W. et al., "A 2.7V 800 MHz-2.1 GHz Transceiver Chipset for Mobile Radio Applications in 25GHz ft Si-Bipolar"; 1994 Bi-Polar/BiCMOS Circuits & Technology Meeting 11.2; pp. 175 178; 1994.

Negus, K. et al., "Highly-Integrated Transmitter RFIC with Monolithic Narrowband Tuning for Digital Cellular Handsets"; Paper WP 2.5; IEEE ISSCC, Digest of Technical Papers; pp. 38-39; Feb. 16, 1994.

Takahashi, C. et al., "A 1.9GHz Si Direct Conversion Receiver IC for QPSK Modulation Systems"; IEEE ISSCC, Paper TA 8.2, Digest of Technical Papers; pp. 138-139; Feb. 16, 1995.

Liu, H-C. et al., "A Low-Power Baseband Receiver IC for Frequency-Hopped Spread Spectrum Applications"; IEEE Custom Integrated Circuits Conference: pp. 311-314; 1995.

Thamsirianunt, M. et al., "CMOS VCOs for PLL Frequency Synthesis in GHz Digital Mobile Radio Communications"; IEEE Custom Integrated Circuits Conference; pp. 331-334.

Moniz, J.M. et al., "Improving the Dynamic Range of Si MMIC Gilbert Cell Mixers for Homodyne Receivers"; IEEE 1994 Microwave and Millimeter-Wave Monolithic Circuits Symposium; pp. 103-106; 1994.

Weaver, D. K., Jr., "A Third Method of Generation and Detection of Single-Sideband Signals"; Proceedings of the IRE; • •. 1703-1705; Dec. 1956.

Koullias, I. A. et al., "A 900MHz Transceiver Chip Set for Dual-Mode Cellular Radio Mobile Terminals"; IEEE ISSCC; Paper TP 9.2; pp. 140-141; Feb. 25, 1993.

(56) References Cited

OTHER PUBLICATIONS

Min, J. et al., "An All-CMOS Architecture for a Low-Power Frequency-Hopped 900 MHz Spread Spectrum Transceiver": IEEE 1994 Custom Integrated Circuits Conference; pp. 379 382; 1994.
Wilson, J. F. et at., "A Single-Chip VHF and UHF Receiver for Radio Paging"; IEEE Journal of Solid-State Circuits: vol. 26, No. 12; pp. 1944-1950; Dec. 1991.
Deeney, M., "Software Radio—the End of RF Design?": Teltec Ireland, A Supplement to Technol.. Ireland—Telecommunications Research & Develo•ment; Nov. 1996.
Standard Search Report for RS 99030 dated Jul. 23, 1997 completed Jul. 21, 1997.
Hess, K. M. et al., "Performance Evaluation of a Single Chip Radio Transceiver": National Semiconductor Corporation; XP000593123; Vehicular Technology Conference, Mobile Technology for the Human Race Atlanta, Apr. 28-May 1, 1996; Institute of Electrical and Electranics Engineers; Published Apr. 28, 1996; pp. 1048-1051.
Gibson , J. D., •The Communication Handbook: A CRC handbook published in cooperation with IEEE Press: Cover Pa•es and . . . 87-93.
Baines, R., "The DSP Bottleneck": I EE Communications Magazine; vol. 33, No. 5; pp. 46.
D.M. Bakker et at. "Bluetooth End to End", M&T Books, an imprint of Hungry Mind, Hungry Minds, Inc., ISBN: 0-7645-4887-5, 7 pages.
David Blankenbeckler, "An Introduction to Bluetooth" ThinkBurst Media, Inc. www.wirelessdevnet.com/channels/bluetooth/features/bluetooth.html, pp. 1-7, Jul. 23, 2004.
Ing. Zdenek Mikeska, "Parameters of Bluetooth receiver and transmitter", Jan. 2, 2004, Institute of Electrical Engineering and Communication, Brno University of Technology, Czech Republic, pp. 1-9.
Hooman Darabi et at., "A 2.4-GHz CMOS Transceiver for Bluetooth", IEEE Journal of Solid-State Circuits, vol. 36, No. 12, Dec. 2001.
Broadcast.Com "BCM2002X GHz Bluetooth Frac-N-Radio" Product Brief 2003.
Pietro Andreani et al. "A CMOS gm-C IF Filter for Bluetooth", in Proceedings of CICC 2000, paper 18-6, May 2000, 4 pages.
Jan Crols et al., "A Single-Chip 900 MHz CMOS Receiver Front-End with a High Performance Low-IF Topology", IEEE Journal of Solid-State Circuits, vol. 30, No. 12, Dec. 1995, Katholieke Universiteit Leuven, Heverlee, Belgium.
Asad A. Abidi, "Direct-Conversion Radio Transceivers for Digital Communiations," IEEE Journal of Solid-State Circuits, vol. 30, No. 12, Dec. 1995, Katholieke Universiteit Leuven, Heverlee, Belgium, pp. 1390-1411.
M. Steyaert, A 1-GHz Single-Chip Quadrature Modulator, IEEE Journal of Solid-State Circuits, vol. 27, No. 8, Aug. 1992, pp. 1194-1197.
Jack P.F. Glas, "Digital I/Q Imbalance Compensation in a Low-IF Receiver" IEEE Globecom, pp. 1461-1466, Nov. 1998.
Vito Boccuzzi et al., "Testing the Double Low-IF Receiver Architecture" Proceedings of the CICC, IEEE, 1997, pp. 521-524.
Valkama et al., "BSS Based I/Q Imbalance Compensation in Communication Receivers in the Presence of Symbol Timing Errors", Proc. Second Int. Workshop Independent Component Analysis Blind Signal Separation, Helsinki, Finland, Jun. 2000, pp. 393-398.
J. Sevenhans et al., "An Analog Radio Front-end Chip Set for a 1.9 GHz Mobile Radio Telephone Application" 1994 IEEE International Solid-State Circuits Conference, Feb. 16, 1994.
J.O. Voorman "Continuous-time analog integrated filters" Integrated Continuous-Time Filters, New York IEEE Press, 1993.
Jan Crols et al., An Analog Integrated Polyphase Filter for a High Performance Low-IF Receivers, 1995 Symposium on VLSI Circuits Digest of Technical Papers, Katholieke Universiteit Leuven, Heverlee, Belgium.
M.J. Gingell, "Single Sideband Modulation using Sequence Asymmetric Polyphase Networks" Electrical Communications—vol. 48, No. 1 and 2—1973.
Stephen A. Jantzi, A Fourth-Order Bandpass Sigma-Delta Modulator, IEEE Journal of Solid-Sate Circuits, vol. 28, No. 3, Mar. 1993.
Jan Crols et al., "A 1.5 GHz Highly Linear CMOS Downconversion Mixer" IEEE Journal of Solid-State Circuits, vol. 30, No. 7, Jul. 1993.
Floyd M. Gardner, Chapter 8 "Phaselock Receivers and Transponders," "Phaselock Techniques" ISBN: 0-471-04294-3, Apr. 1979.
Trudy D. Stetzler et al., A 2.7-4.5 V Single Chip GSM Transceiver RF Integrated Circuit, IEEE Journal of Solid-State Circuits, vol. 30, No. 12, Dec. 1995.
Crols, J., et al., "Low-IF Topologies for High-Performance Analog Front Ends of Fully Integrated Receivers," IEEE Transactions on Circuits and Systems—II: Analog and Digital Signal Processing, vol. 45, No. 3, Mar. 1998, pp. 269-282.
Groshong, R. et at., "Undersampling Techniques Simplify Digital Radio", Application Note AN-301, published by Analog Devices, Inc., reprinted from Electronic Design; pp. 3-95-3-101; May 23, 1991.
Van Dooremolen, W.H.A. et al., "A Complete FM Radio on a Chip"; Integrated Circuits, Application Note AN192' Phili.s Semiconductors;_Dec. 1991.
Kasperkovitz, D ""An Integrated FM Receiver""; Microelectronics Reliability, v. 21(2); pp. 183-189; 1981.
Kasperkovitz, W.G., "FM Receivers for Mono and Stereo on a Single Chip"; Philips Technical Review: V. 41(6); pp. 169-182; 1983/84.
Olmstead, C. et al., "Di•ital IF Processin•", RF Desi.n; • •. 30-40: Se•tember 1994.
Cavers, J. et al., "A DSP-Based Alternative to Direct Conversion Receivers for Digital Mobile Communications"; pp. 2024-2029; IEEE, 1990.
Cavers, J. et al., "Adaptive Compensation for Imbalance and Offset Losses in Direct Conversion Transceivers"; IEEE Transactions on Vehicular Technology; vol. 42, No. 4; pp. 581-588; Nov. 1993.
Gray et al., "Future Directions in Silicon ICs for RF Personal Communications"; Custom Inte. rated Circuits Conference; 0 •. 83-90; 1995.
Paez-Borrallo, J. et al., "Self Adjusting Digital Image Rejection Receiver for Mobile Communications"; IEEE Vehicular Technology. Conference; vol. 2; pp. 686-690; Mar. 1997.
Oscarsson, F. et at., Wideband HF Receiver with Digital Quadrature Splitting; Proceedings on the Fourth International Conference on Signal Processing Applications and Technology; pp. 1267-1271, 1993.
Vanwelsenaers, A., et at., "Alcatel Chip Set for GSM Handportable Terminal"; Proceedings of 5th Nordic Seminar on Digital Mobile Radio Communications DMR V; Helsinki Finland; pp. 265-271; Dec. 1-3, 1992.
Gibson, J.D., "The Communications Handbook," 1997, pp. 87-93, 181-182, 367 371, 1321-1322.
Translation of Office Action dated Oct. 24, 2006 for Japanese Application No. 10-536563.

\* cited by examiner

RADIO TRANSCEIVER ON A CHIP

BACKGROUND OF THE INVENTION

1. Technical Field of the Invention

The present invention relates in general to the wireless communications field and, in particular, to a short-range radio transceiver fabricated on an integrated circuit chip.

2. Description of Related Art

The high level of circuit integration possible with modern technology has allowed manufacturers of hand-held communications equipment (e.g., cellular phones) to substantially reduce the size of their products. As a general rule, these smaller products consume less power and ultimately become cheaper to produce.

In the past, there have been a number of attempts to fabricate an entire radio transmitter/receiver (transceiver) on a single integrated circuit (IC) chip. Generally, these attempts have been unsuccessful, and only parts of such radios have been placed on a single chip. For example, U.S. Pat. No. 5,428,835 to Okanobu discloses a receiver circuit formed on a single semiconductor chip. The primary reason for this lack of total integration can be found in the radio system specifications.

Most standard air interface specifications for radio communications systems set forth high requirements with respect to frequency accuracy, adjacent channel interference, modulation performance, etc. However, existing on-chip signal processing techniques have not yet reached a level that can meet the performance criteria set by these air interface specifications.

SUMMARY OF THE INVENTION

It is an object of the present invention to significantly reduce the overall size of a radio transceiver.

It is another object of the present invention to produce a short-range wireless radio link that is less costly than a cable link.

It is yet another object of the present invention to produce a short-range radio transceiver on a single integrated circuit chip.

In accordance with the present invention, the foregoing and other objects are achieved by a radio transceiver architecture that can be completely integrated into one semiconductor IC chip. In order to integrate the transceiver's IF filters into the chip, a heterodyne architecture with a relatively low IF is used. A single directly modulated VCO is used for both up-conversion during transmission, and down-conversion during reception. Bondwires are used as resonators in the oscillator tank for the VCO. A time-division duplex scheme is used in the air interface to eliminate cross-talk or leakage. A Gaussian-shaped binary FSK modulation scheme is used to provide a number of other implementation advantages.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1-5 of the drawings, like numerals being used for like and corresponding parts of the various drawings.

For the preferred embodiment, the air interface specification allows digital transmission of both voice and data. Such an air interface that can be used is described in commonly-assigned U.S. patent application Ser. No. 08/685,069 to Dent, et al., filed Jul. 13, 1996, entitled "Short-Range Radio Communications System And Method Of Use." The frequency band that can be used is the unlicensed Industrial, Scientific, Medical (ISM) band at 2.4 GHz, which has 83.5 MHz bandwidth available for use. However, in the United States, the Federal Communications Commission (FCC) requires frequency spreading for operations where the transmitted power is higher than 0 dBm. There can be numerous "interferers" or "jammers" operating in this band (e.g., microwave ovens are notorious "interferers" in this band). Consequently, a frequency hopping scheme is used to provide increased immunity to such interference. Notably, in contrast to direct sequence frequency spreading, the interference immunity provided by frequency hop spreading is independent of the jammer's transmitted power.

In addition, with respect to the preferred embodiment, average frequency spreading over the entire 83.5 MHz band results without having to process wide bandwidth signals. Although the frequency spectrum that the embodied transceiver can be operated in is wide enough to provide the spreading, the instantaneous bandwidth can be small, which allows the transceiver's front end to be operated at a narrow band. In the preferred system, the instantaneous (channel) bandwidth is 1 MHz, whereas the hopping is carried out in a pseudo-random way over 79 hop channels (spanning 79 MHz). The preferred modulation scheme used is binary Gaussian-shaped frequency shift keying (GFSK). This approach provides a robust wireless communications link and allows the use of relatively simple transmitter and receiver circuitry.

For the preferred embodiment, the information signals are transmitted in packets. Automatic Repeat Request (ARQ) error correction is employed to re-transmit packets received with errors in the data field. The voice field is not re-transmitted, but the (robust) Continuous Variable Slope Delta (CVSD) modulation scheme is used for speech coding. CVSD is a type of adaptive delta modulation scheme whereby performance degrades gracefully in the presence of noise. A time-division duplex (TDD) scheme is used to achieve a full-duplex communications link. A duplex frame lasts 1.25 ms, in which a packet is sent in one direction during the first 625 μs, and another packet is sent in the opposite direction during the second 625 μs. Each transmission occurs at a new hop frequency, which is determined by the user-dependent pseudo-random hop sequence.

In order to better understand the invention, it will be useful at this point to describe a radio transceiver in general terms.

Figure 1:
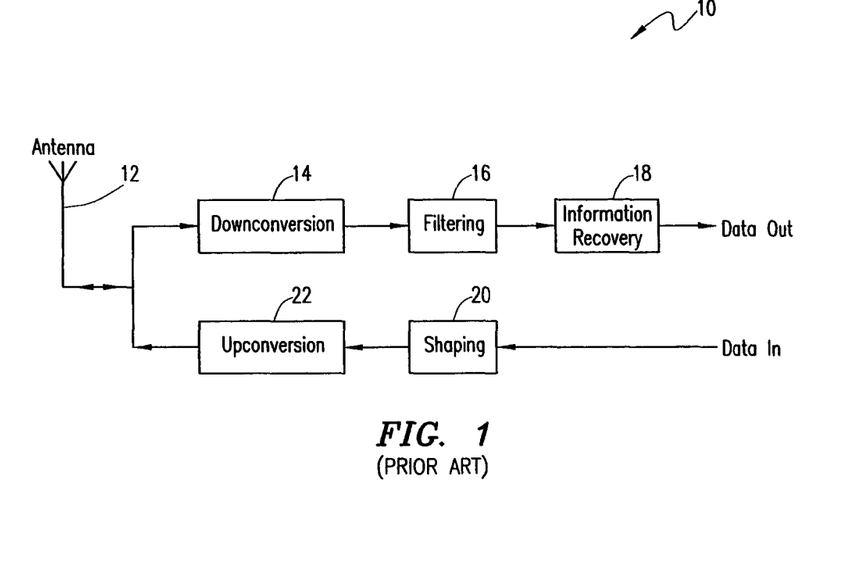
FIG. 1 is a basic functional block diagram of a radio transceiver architecture, which can be used to facilitate an understanding of the present invention.

FIG. 1 is a basic functional block diagram of a radio transceiver architecture (10), which can be used to facilitate an understanding of the present invention. First considering the receiver section of the transceiver, due to requirements imposed based on antenna size and propagation conditions, the signals propagated over the air are normally conveyed by radio-frequency (RF) carriers. An RF signal received at the antenna (12) is frequency down-converted (14) to facilitate signal processing. Notably, the information being carried has a much lower rate than the carrier frequency. Next, the down-converted signal is filtered (16), in order to suppress all interference and noise outside the frequency band of interest, and thus improve the receiver's signal-to-noise ratio. This process is commonly referred to as "channel filtering," since only the channel or frequency band of interest is filtered out.

Once the received signal has been channel filtered, the next step in the process is to recover the information (18) from the channel and convert it into a usable format. For example, the information recovered can be in the form of discrete symbols (e.g., data out) such as those used in digital modulation schemes, or an analog signal for audio or video applications. Notably, the key function of the receiver section is to filter out the band of interest from the rest of the frequency spectrum.

The transmitter section of the transceiver (10) converts or shapes (20) the information to be transmitted into a signal format that can be conveyed by a carrier. That signal is then frequency upconverted (22) to the desired high frequency (RF) band and transmitted from the antenna (12). Notably, for the transmitter section, the key function is to confine the transmitted signal power to the band of interest (i.e., to leak as little signal power as possible to frequencies outside the band of interest).

Figure 2:
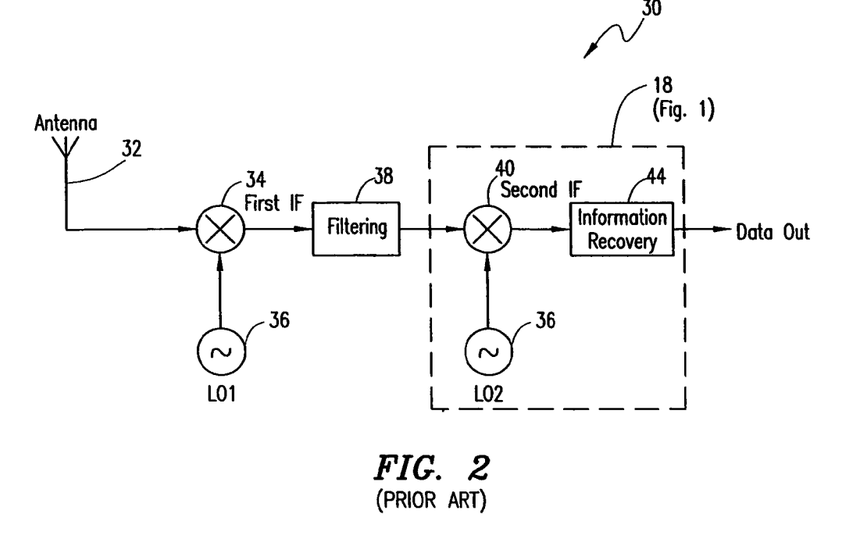
FIG. 2 is a block diagram of a conventional receiver section, which can be used to implement the functions of the receiver section shown in FIG. 1.

FIG. 2 is a block diagram of a conventional receiver section 30, which can be used to implement the functions of the receiver section shown in FIG. 1. Most conventional radio receivers employ a superheterodyne receiver architecture, such as the architecture of receiver section 30 shown in FIG. 2. The received RF carrier from antenna 32 is down-converted to a first intermediate frequency (IF) by mixing (34) the RF signal with a first local oscillator signal (36). A suitable bandpass filter 38 (e.g., with sharp cut-off characteristics) is used for channel filtering. The channel filtered signal is then down-converted to a baseband signal, by mixing (40) the filtered signal with a second local oscillator signal (42). At this point, additional filtering of the baseband signal may be used. The information to be used (e.g., data) is thereby recovered (44).

One problem with integrating such a receiver on a chip deals with integrating the IF bandpass filters (e.g., 38). For example, the performance of a filter is determined by its quality (Q) factor. Q is a measure of a filter's selectivity (how well it filters) and can be represented by the expression: $Q=f_0/BW$, where ($f_0$) is the filter's center frequency, and BW is the filter's bandwidth. Therefore, a narrow filter centered at a high frequency would have a high Q.

Generally, bandpass filters can be fabricated by a number of techniques and integrated on semiconductor chips. However, the Q values achievable for such filters are significantly limited using conventional electronic components in silicon technology. The primary limiting factors are the losses that occur between electronic components on the chip.

With respect to reducing interference and noise, only the bandwidth (BW) of the filter determines its performance in terms of signal-to-noise ratio. For a fixed bandwidth, low-Q filters can be integrated on a chip by lowering the center frequency, $f_0$. For the extreme case, $f_0$ becomes zero and the bandpass filter becomes a lowpass filter, which is much easier to integrate on chip than a bandpass filter. In this case, the signal being processed can be converted to baseband with only one down-conversion step. Of course, this approach is attractive from an integration standpoint and is indeed a way to obtain full integration. However, a second problem occurs with this approach, which is referred to as a "homodyne" or "zero-IF" architecture.

A so-called "DC offset" problem occurs with a zero-IF architecture, because the signal being processed is mapped directly to DC. Consequently, interference at DC is indistinguishable from the desired signal and cannot be filtered out. This problem also places more stringent requirements on the even order intermodulation characteristics of the receiver. Part of the DC offset can be removed with additional signal processing, but this approach increases circuit complexity and the power consumption of the IC.

An intermediate approach, which is suitable for integrating IF filters on a semiconductor chip, is to use a "low-IF" architecture. With this approach, the IF or filter's center frequency, $f_0$, is a relatively low frequency, but not zero. This type of architecture allows fabrication of a low Q filter which is suitable for integration on a chip while avoiding DC problems.

Nevertheless, a third problem arises, which has to do with the image carrier. The process of mixing the received (RF) signal with a local oscillator carrier, $f_{lo}$, produces a low IF signal, $f_0$, which not only maps the frequency band of interest at $f_{lo}+f_0$, but also maps the image band at $f_{lo}-f_0$ to the IF signal (or vice versa). This process causes a significant problem, because after the two RF bands are mapped onto the same IF band, they are no longer distinguishable from each other. Therefore, an image-rejection device should be used.

Figure 3:
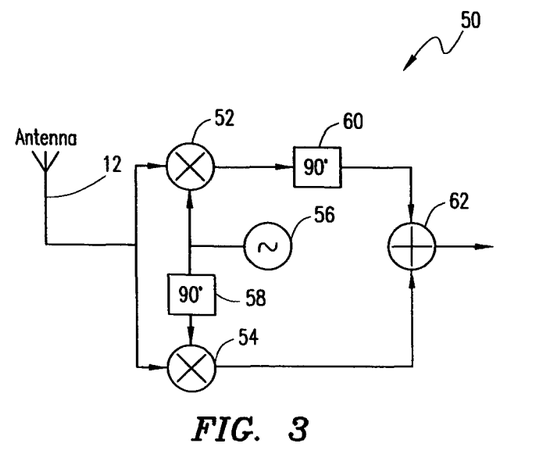
FIG. 3 is a block diagram of an image-rejection mixer stage that can be used for down-conversion with the receiver architecture illustrated in FIG. 1.

FIG. 3 is a block diagram of an image-rejection mixer stage (50) that can be used for down-conversion with the receiver architecture illustrated in FIG. 1. Using such a stage, the received RF signal from antenna 12 is coupled to a first and second mixer (52, 54). A local oscillator signal (56) is coupled directly to the first mixer (52), and also phase-shifted 90 degrees (58) and coupled to the second mixer (54). The down-converted signal from the first mixer (52) is phase-shifted 90 degrees (60) and algebraically added (62) to the phase-shifted, down-converted signal from the second mixer (54), which ultimately functions to suppress the image band.

The amount of image band suppression that can be realized with such image-rejection circuitry (e.g., FIG. 3) depends on how well the circuit components can be matched, and depends on the frequency bandwidth over which suppression is desired. With on-chip components, a relatively high matching accuracy should be attainable. Nevertheless, in practice, the image rejection actually attainable for on-chip circuitry is somewhat limited (e.g., about 30-40 dB for a 1 MHz bandwidth). However, in accordance with the present invention (as described above with respect to the air interface), a frequency hopping system is employed in which each packet is transmitted in one of 79 available hop frequencies. Occasionally, interference such as a collision between packets can occur if two different users simultaneously occupy the same frequency hop. Consequently, with reduced image rejection performance, it follows that different users's packets occupying each other's image bands can also interfere with each other. In any event, for the preferred embodiment, such occasional packet collisions, whether resulting from co-channel, image-channel, or adjacent channel interference, are accounted and compensated for in the air interface operations by employing an appropriate ARQ protocol for data transfers, and a robust speech coding format (e.g., CVSD) for voice transfers. In other words, the present invention compensates for degraded receiver performance due to image interference, by the use of frequency hop spreading, error correction, and speech coding techniques specified for the air interface, which allows full integration of the receiver and (as described below) transmitter sections of the transceiver on a single IC chip.

Previously, when an attempt was made to place a transmitter and receiver on a single chip, one problem that occurred was that signals transmitted at relatively high power levels leaked into the receiver's input stage. In fact, such leakage or "cross-talk" has been a major design problem in previous attempts to fabricate an entire transceiver on a chip. However, for the preferred embodiment of the invention, a TDD scheme is used for duplex operation over the air interface, which eliminates cross-talk and thereby facilitates full integration of the transceiver on a chip. In other words, the transmitter and receiver sections of the embodied transceiver are not active simultaneously, and the problem of cross-talk or leakage from the transmitter to receiver in a fully integrated transceiver is resolved.

Additionally, cross-talk or leakage can be reduced further by employing different transmit and receive frequencies using a frequency-division duplex (FDD) scheme. Normally, the use of an FDD scheme would require a duplexer at the transceiver's antenna stage in order to separate the transmitted and received signals. However, by also employing a TDD scheme in accordance with the invention, such a duplexer is not needed. Moreover, to further reduce the number of components on the chip, a single variable controlled oscillator (VCO) is used in the preferred embodiment, alternately for up-conversion in the transmit section and down-conversion in the receive section.

Figure 4:
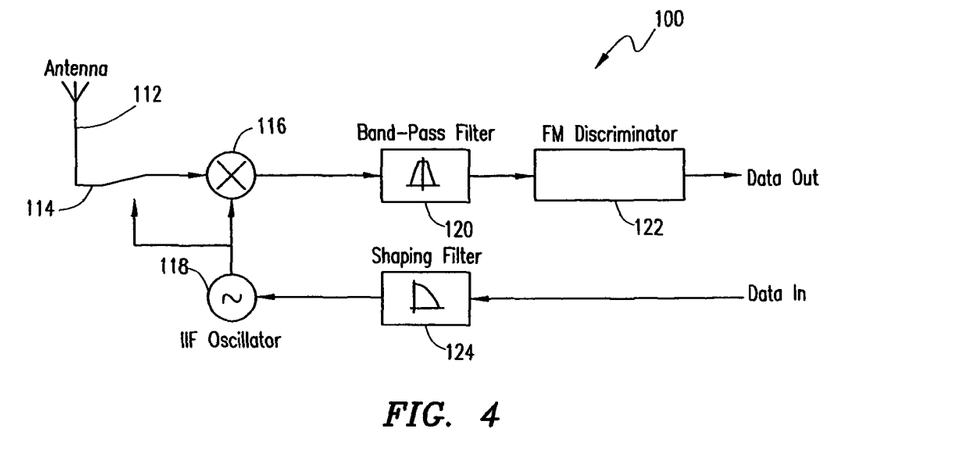
FIG. 4 is a schematic block diagram of a single chip transceiver architecture, which can be used to implement the apparatus and method of the present invention.

FIG. 4 is a schematic block diagram of a single chip transceiver architecture, which can be used to implement the apparatus and method of the present invention. For the preferred embodiment, binary FSK shaped with a Gaussian filter is the modulation scheme used. Specifically, the use of FSK modulation for a single chip transceiver has a number of implementation advantages. For example, the detection function is carried out directly at the IF with a frequency modulation (FM) discriminator stage (122). This approach eliminates the need for a second down-conversion to baseband stage for information recovery. Next, the transmit section is simplified so that the information symbols to be transmitted can be coupled directly to a VCO (e.g., HF oscillator 118), which converts these symbols to an FM signal. With this approach, a single VCO is sufficient for the transmit section, and the need for a separate up-conversion mixer is eliminated. Yet another advantage of using FSK is that the non-coherent detection of FSK signals is relatively insensitive to frequency errors. In this case, a frequency error shows up as a DC offset signal at the output of the FM detector. However, an automatic frequency control (AFC) stage can be used to quickly compensate for the offset. This approach eliminates the need for highly stable local oscillator stages or accurate frequency tracking schemes.

Still another advantage of FSK modulation is that the received signal can be hard-limited after channel filtering. The information being received is contained only in the phase and not in the amplitude of the signal. Consequently, this approach eliminates the need for awkward automatic gain control (AGC) circuitry and amplitude tracking schemes. The AGC operation would also be severely hindered by the frequency hopping defined in the air interface due to the un-correlated signal fading on the different hop frequencies.

Returning to FIG. 4, by making appropriate adjustments in the air interface (as described above) to compensate for implementation problems encountered with others' previous attempts to integrate an entire transceiver on a single IC chip, the relatively simple architecture shown in FIG. 4 can be used (in accordance with the present invention). In comparison with the architecture disclosed in FIG. 1, the basic blocks of FIG. 1 are still recognizable. Notably, each basic block shown in FIG. 1 can be replaced by only one circuit in the architecture shown in FIG. 4. For example, in FIG. 4, the down-conversion step is performed in the image-rejection mixer (116), which converts the signal from RF to a low IF. A bandpass filter (120), which is selective at this low IF, performs the channel selection. This channel filtered signal is then recovered in an FM discriminator (122). Notably, no second down-conversion step to a lower IF or baseband frequency is required, since the FM discriminator (122) can detect the received signal directly at the low IF.

In the transmitter section of FIG. 4, the signal to be transmitted is shaped with a Gaussian shaping filter (124) in order to suppress the out-of-band signal power. The shaped signal is coupled directly to a VCO (118), which generates the FM signal directly at the desired RF. Notably, only a single VCO is needed for the entire transceiver. This same VCO (118) performs the down-conversion function during the receive cycle, and the up-conversion function during the transmit cycle. The low-IF used is selected at an appropriate frequency, in order to allow on-chip integration of a bandpass filter (120) with sufficient selectivity. For the preferred embodiment, a 3 MHz IF ($f_0$) is used, which allows implementation of a CMOS gyrator filter (on chip) with a bandwidth of 1 MHz and, thus, a Q of 3. The low-pass shaping filter (124) and a low-pass detection filter (not explicitly shown) subsequent to the FM discriminator can be implemented in a similar way. The FM detector (122) is preferably fabricated as a quadrature detector. For the VCO stage (118), bond-wire inductors are used as resonators in the oscillator tank, without external (off-chip) components. Preferably, all filters are tuned with a common reference circuit to compensate for fabrication tolerances.

Figure 5:
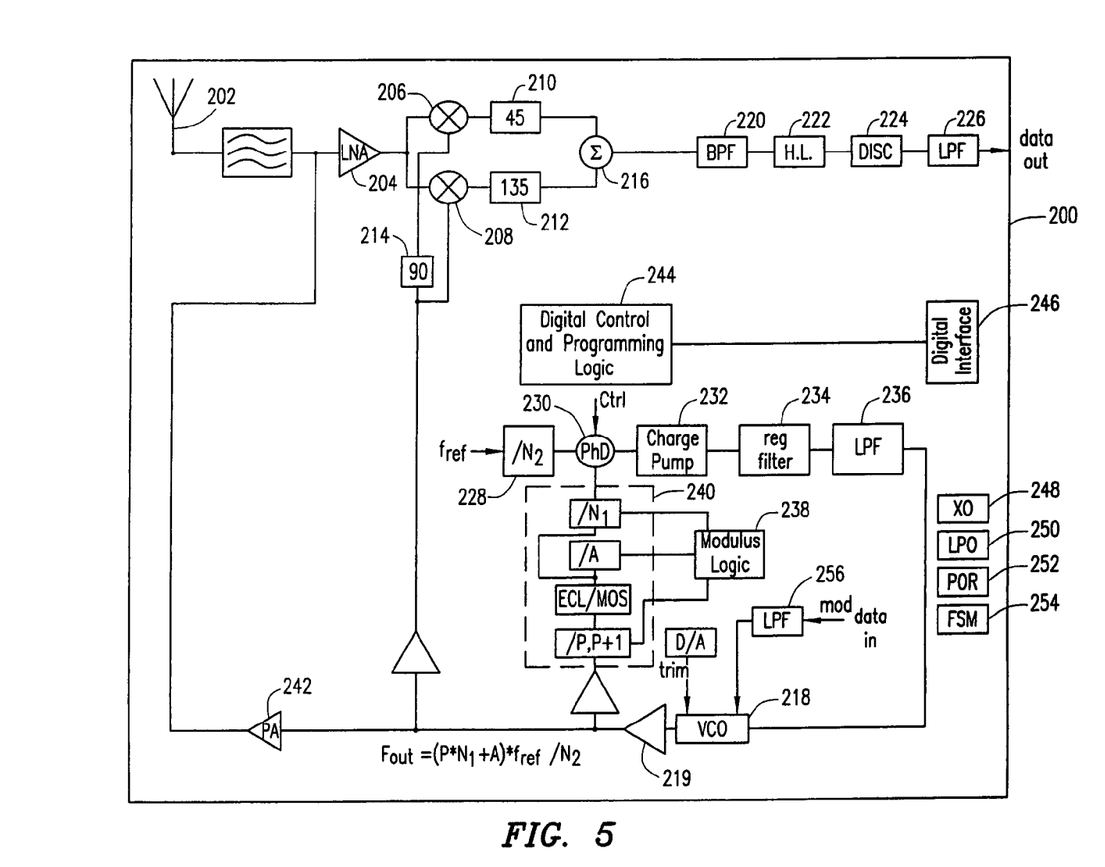
FIG. 5 is a detailed circuit block diagram of a radio transceiver on a single IC chip, in accordance with a second embodiment of the present invention.

FIG. 5 is a detailed circuit block diagram of a short-range radio transceiver mounted on a single IC chip, in accordance with a second embodiment of the present invention. However, although the radio transceiver shown is described with respect to a single IC chip implementation, this description is for illustrative purposes only and the present invention is not intended to be so limited. For example, some of the components shown in FIG. 5 may be located external to the IC chip. Returning to FIG. 5, the transceiver on a chip (200) includes a transmit/receive antenna 202 coupled to a low noise amplifier (LNA) 204 in the receiver front end. The output of the LNA is coupled to an image-rejection mixer, which is composed of a first mixer 206 for the I channel, a second mixer 208 for the Q channel, a 45 degree phase shifter 210, a 135 degree phase shifter 212, a 90 degree phase shifter 214, and a combiner 216. A local oscillator signal is coupled to the 90 degree phase shifter 214 from a VCO 218. Consequently, image rejection is accomplished by recombining the phase shifted IF I and Q signals to produce an output IF signal from the combiner 216.

For this embodiment, the IF signal selected is about 3.0 MHz. The IF signal output from the combiner 216 is coupled to the IF receiver circuitry, which includes a bandpass filter 220 to suppress signals on adjacent channels. The bandpass filter is preferably a stagger-tuned IF filter using transconductance-C type filtering. The IF receiver circuitry also includes a hard limiter (H.L.) 222, an FM discriminator 224, and a lowpass filter 226. The IF receiver circuitry can also include an RSSI indicator with an A/D converter (not explicitly shown). The IF signal is detected (224), and the information recovered is output from the lowpass filter 226.

Transceiver 200 on a chip also includes a phase locked loop, which is composed of a phase detector 230, loop filter 236, and a prescaler with modulus logic 240. The phase locked loop is a component of a synthesizer including the phase detector 230, charge pump 232, regulator filter 234, loop filter 236, prescaler 240, modulus logic circuitry 238, VCO 218, and a buffer 219. As such, the input information signal (e.g., data in), shaped by the shaping filter 256, is used to directly modulate the VCO. A sample-and-hold (S/H) circuit (not explicitly shown) stabilizes the input voltage to the VCO, while the VCO is being directly modulated. The VCO 218 is also a component of the transmitter section. For transmissions, the output of the VCO 218 is coupled to a power amplifier 242 and to the antenna 202.

Fully differential signal paths are used to suppress common-mode noise and interference signals. In addition, all receive filters, transmit filters, and the FM discriminator apply matched electronic circuits. Autotuning of all the filters and the discriminator is provided by a reference filter which is locked to the crystal oscillator 248.

The transceiver 200 also includes digital circuitry 244 to provide power down control, programming of certain analog blocks on the chip due to process variations, and synthesizer control logic. The digital circuitry 244 is connected to a serial digital interface connection 246. A number of typical functional circuit blocks are also included on the chip, such as, for example, a crystal oscillator (XO) 248, frequency adjustable low power oscillator (LPO), power-on-reset (POR) 252, and finite state machine (FSM) 254. Consequently, the one chip transceiver shown in FIG. 5 includes power down logic for all analog circuit blocks, logic to tune the analog circuit blocks, a serial-to-parallel converter, and decoding logic.

In summary, as illustrated by the embodiments shown in FIGS. 4 and 5, an entire radio transceiver is completely integrated into one IC chip. In order to integrate the IF filters on the chip, a heterodyne architecture with a relatively low IF is used. A single directly modulated VCO is used for both up-conversion and down-conversion, and bond-wires are used as resonators in the oscillator tank for the VCO. A TDD scheme is used in the air interface to eliminate cross-talk or leakage. A Gaussian-shaped binary FSK modulation scheme is used to provide a number of other implementation advantages (as described above).

Although a preferred embodiment of the method and apparatus of the present invention has been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

The invention claimed is:

1. A radio transceiver for receiving and transmitting high frequency signals, the radio transceiver comprising:
    a down-conversion section configured to down-convert a received first high frequency signal, generating a down-converted signal;
    an up-conversion section configured to up-convert an information signal, to be transmitted, to a second high frequency signal;
    a variable controlled oscillator connected to the up-conversion section and to the down-conversion section for down-converting the first high frequency signal during a receive cycle and up-converting the information signal during a transmit cycle in a time division duplex mode; and
    a channel selection filter connected to the down-conversion section and configured to perform channel-selection filtering on the down-converted signal, thereby generating a received filtered signal;
    wherein the up-conversion section, the down-conversion section, the channel-selection filter, and the variable controlled oscillator are integrated on a single IC chip; and
    the radio transceiver is configured to employ a frequency hopping scheme.

2. The radio transceiver according to claim 1, wherein the radio transceiver is further configured to employ automatic repeat request error correction.

3. The radio transceiver according to claim 2, further comprising:
    a detector for detecting a received data signal from the received filtered signal, wherein the detector is integrated on the single IC chip.

4. The radio transceiver according to claim 1, wherein the radio transceiver is configured to employ a binary Gaussian-shaped frequency shift keying modulation scheme.

5. The radio transceiver according to claim 1, wherein the radio transceiver is configured to employ continuous variable-slope delta modulation for speech coding.

6. The radio transceiver according to claim 1, wherein the down-conversion section is an image-rejection down-conversion section.

7. The radio transceiver according to claim 6, wherein the image-rejection down-conversion section comprises:
    a first mixer configured to receive the high frequency signal at an input and to be driven by a local oscillator signal; and
    a second mixer configured to receive the high frequency signal at an input and to be driven by a 90-degree phase shifted version of the local oscillator signal.

8. The radio transceiver according to claim 7, wherein the image-rejection down-conversion section further comprises:
    phase-shifting circuitry configured to provide a mutual 90-degree phase shift between output signals from the first and the second mixer; and
    a combiner for recombining the 90-degree mutually phase shifted output signals from the first and the second mixer, thereby generating the down-converted signal.

9. The radio transceiver according to claim 1, further comprising:
    a low noise amplifier, integrated on the single integrated circuit chip and connected to provide the received high-frequency signal to the down-conversion section.

10. A hand-held communications device, comprising a radio transceiver for receiving and transmitting high frequency signals, the radio transceiver including:
    a down-conversion section configured to down-convert a received first high frequency signal, generating a down-converted signal;
    an up-conversion section configured to up-convert an information signal, to be transmitted, to a second high frequency signal;
    a variable controlled oscillator connected to the up-conversion section and to the down-conversion section for down-converting the first high frequency signal during a receive cycle and up-converting the information signal during a transmit cycle in a time division duplex mode; and
    a channel selection filter connected to the down-conversion section and configured to perform channel-selection filtering on the down-converted signal, thereby generating a received filtered signal;

wherein the up-conversion section, the down-conversion section, the channel-selection filter, and the variable controlled oscillator are integrated on a single IC chip; and the radio transceiver is configured to employ a frequency hopping scheme.

11. The hand-held communications device of claim 10, wherein the radio transceiver is further configured to employ automatic repeat request error correction.

12. The hand-held communications device of claim 11, wherein the radio transceiver further includes:
a detector for detecting a received data signal from the received filtered signal, wherein the detector is integrated on the single IC chip.

13. The hand-held communications device of claim 10, wherein the radio transceiver is configured to employ a binary Gaussian-shaped frequency shift keying modulation scheme.

14. The hand-held communications device of claim 10, wherein the radio transceiver is configured to employ continuous variable-slope delta modulation for speech coding.

15. The hand-held communications device of claim 10, wherein the down-conversion section is an image-rejection down-conversion section.

16. The hand-held communications device of claim 10, wherein the image-rejection down-conversion section comprises:
a first mixer configured to receive the high frequency signal at an input and to be driven by a local oscillator signal; and
a second mixer configured to receive the high frequency signal at an input and to be driven by a 90-degree phase shifted version of the local oscillator signal.

17. The hand-held communications device of claim 16, wherein the image-rejection down-conversion section further comprises:
phase-shifting circuitry configured to provide a mutual 90-degree phase shift between output signals from the first and the second mixer; and
a combiner for recombining the 90-degree mutually phase shifted output signals from the first and the second mixer, thereby generating the down-converted signal.

18. The hand-held communications device of claim 10, wherein the radio transceiver further includes:
a low noise amplifier, integrated on the single integrated circuit chip and connected to provide the received high-frequency signal to the down-conversion section.

* * * * *

UNITED STATES PATENT AND TRADEMARK OFFICE
CERTIFICATE OF CORRECTION

| | |
|---|---|
| PATENT NO. | : 8,626,086 B2 |
| APPLICATION NO. | : 13/205984 |
| DATED | : January 7, 2014 |
| INVENTOR(S) | : Gärdenfors et al. |

It is certified that error appears in the above-identified patent and that said Letters Patent is hereby corrected as shown below:

On the Title Page

Item (12), under "United States Patent", in Column 1, Line 1, delete "Gardenfors" and insert -- Gärdenfors --, therefor.

Item (75), under "Inventors", in Column 1, Line 1, delete "Karl Hakan Torbjorn Gardenfors," and insert -- Karl Håkan Torbjörn Gärdenfors, --, therefor.

Item (75), under "Inventors", in Column 1, Line 2, delete "Bjarred" and insert -- Bjärred --, therefor.

On Page 3, Item (56), under "OTHER PUBLICATIONS", in Column 1, Line 43, delete ""Radio-Fre·uenc Intelrated" and insert -- "Radio Frequency Integrated --, therefor.

On Page 3, Item (56), under "OTHER PUBLICATIONS", in Column 2, Line 16, delete "Radio Entineers, ·. 143-154;" and insert -- Radio Engineers, pp. 143-154; --, therefor.

On Page 3, Item (56), under "OTHER PUBLICATIONS", in Column 2, Line 21, delete "Develo·.," and insert -- Develop., --, therefor.

On Page 3, Item (56), under "OTHER PUBLICATIONS", in Column 2, Line 68, delete "IRE; ··. 1703-1705;" and insert -- IRE; pp. 1703-1705; --, therefor.

On Page 4, Item (56), under "OTHER PUBLICATIONS", in Column 1, Line 9, delete "Develo·ment;" and insert -- Development; --, therefor.

On Page 4, Item (56), under "OTHER PUBLICATIONS", in Column 1, Line 16, delete "Electranics" and insert -- Electronics --, therefor.

Signed and Sealed this
Eighth Day of July, 2014

Michelle K. Lee
*Deputy Director of the United States Patent and Trademark Office*

CERTIFICATE OF CORRECTION (continued)
U.S. Pat. No. 8,626,086 B2

On Page 4, Item (56), under "OTHER PUBLICATIONS", in Column 1, Line 18, delete "Pa·es" and insert -- Pages --, therefor.

On Page 4, Item (56), under "OTHER PUBLICATIONS", in Column 1, Line 19, delete "I EE" and insert -- IEEE --, therefor.

On Page 4, Item (56), under "OTHER PUBLICATIONS", in Column 2, Lines 28-29, delete "Phili.s Semiconductors;_Dec." and insert -- Philips Semiconductors; Dec. --, therefor.

On Page 4, Item (56), under "OTHER PUBLICATIONS", in Column 2, Lines 34-35, delete ""Di·ital IF Processin·", RF Desi·n; ··. 30-40: Se·tember" and insert -- "Digital IF Processing", RF Design; pp. 30-40; September --, therefor.

On Page 4, Item (56), under "OTHER PUBLICATIONS", in Column 2, Line 43, delete "Inte· rated Circuits Conference; 0 ·. 83-90;" and insert -- Integrated Circuits Conference; pp. 83-90; --, therefor.

In the Drawings

In Fig. 2, Sheet 2 of 5, delete " " and insert -- --, therefor.

In Fig. 4, Sheet 4 of 5, delete " IF Oscillator " and insert -- HF Oscillator --, therefor.